United States Patent Office 3,786,088
Patented Jan. 15, 1974

3,786,088
N,O-DICARBAMOYL-N-PHENYLHYDROXYL-
AMINES
John Krenzer, Oak Park, and Sidney B. Richter, Chicago, Ill., assignors to Velsicol Chemical Corporation, Chicago, Ill.
No Drawing. Filed Dec. 5, 1968, Ser. No. 781,585
The portion of the term of the patent subsequent to Apr. 11, 1989, has been disclaimed
Int. Cl. C07c 127/16, 127/18, 127/20
U.S. Cl. 260—545 R     4 Claims

ABSTRACT OF THE DISCLOSURE

This invention discloses new chemical compounds of the formula

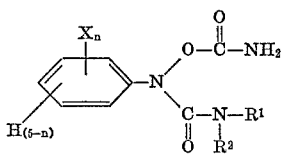

wherein X is selected from the group consisting of alkyl, alkenyl, halogen, haloalkyl, alkoxy, alkylthio, nitro and dialkylamino; $n$ is an integer from 0 to 5; and $R^1$ and $R^2$ are independently selected from the group consisting of hydrogen and alkyl. The compounds of this invention are useful as herbicides and fungicides.

---

This invention relates to new chemical compositions of matter and more particularly relates to compounds of the formula

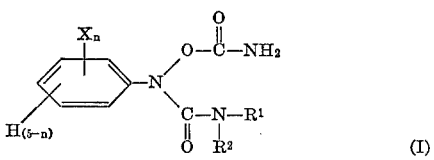

wherein X is selected from the group consisting of alkyl, alkenyl, halogen, haloalkyl, alkoxy, nitro and dialkylamino; $n$ is an integer from 0 to 5; and $R^1$ and $R^2$ are independently selected from the group consisting of hydrogen and alkyl.

In a preferred embodiment of this invention X is selected from the group consisting of lower alkyl, lower alkenyl, chlorine, bromine, lower haloalkyl, lower alkoxy, nitro and di(lower alkyl)amino; $n$ is an integer from 0 to 3; and $R^1$ and $R^2$ are independently selected from the group consisting of hydrogen and lower alkyl. The term lower as used herein designates a straight or branched carbon chain of up to about 10 carbon atoms.

The compounds of the present invention are unexpectedly useful as herbicides and fungicides.

The new compounds of this invention can be readily prepared by reacting a hydroxyurea of the formula

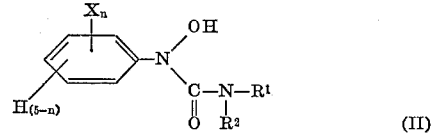

wherein X, $n$, $R^1$ and $R^2$ are as heretofore described with potassium cyanate in the presence of acid. This reaction can be conveniently carried out by utilizing an acidic reaction medium such as glacial acetic acid. Mild reaction conditions can be employed to effect this reaction and temperatures of from about 0 to about 60° C. and preferably temperatures of from about 10 to about 40° C. can be employed. When glacial acetic acid is utilized as a reaction medium the desired product forms as a precipitate and can be readily recovered by filtration therefrom. This product can then be washed with water to remove coprecipitated potassium acetate and can be dried and used as such or can be further purified by common techniques such as recrystallization, trituration, and the like.

Exemplary suitable hydroxyureas of Formula II for preparing the new compounds of this invention are 1-hydroxy-1-phenylurea,
1-hydroxy-1-phenyl-3-methylurea,
1-hydroxy-1-phenyl-3,3-dimethylurea,
1-hydroxy-1-(2-methylphenyl)-3-methylurea,
1-hydroxy-1-(3-chlorophenyl)-3-methylurea,
1-hydroxy-1-(3,4-dichlorophenyl)-3-methylurea,
1-hydroxy-1-(4-bromophenyl)-3,3-dimethylurea,
1-hydroxy-1-(4-allylphenyl)-3-ethylurea,
1-hydroxy-1-(2-methoxyphenyl)-3-isopropylurea,
1-hydroxy-1-(3-nitrophenyl)-3-methylurea,
1-hydroxy-1-(2-dimethylaminophenyl)-3-methylurea,
1-hydroxy-1-(2-methyl-4-chlorophenyl)-3,3-dimethylurea,
1-hydroxy-1-(3,4,5-trichlorophenyl)-3,3-diethylurea and
1-hydroxy-1-(4-chlorophenyl)-3-methyl-3-t-butylurea.

The manner in which the compounds of the present invention can be prepared readily is illustrated more specifically in the following examples.

EXAMPLE 1

Preparation of 1-(3,4-dichlorophenyl)-
1-carbamoyloxy-3-methylurea 1-(3,4 - dichlorophenyl)-1-hydroxy - 3 - methylurea (8 grams) dissolved in glacial acetic acid (40 ml.) was placed in a glass reaction flask equipped with a mechanical stirrer and cooling means. The solution was cooled to a temperature of from about 10 to about 15° C. and potassium cyanate (3.2 grams) was added thereto. The mixture was allowed to stand for a period of about 2 hours resulting in the formation of a solid. After this time water (200 ml.) was added to the reaction mixture and the mixture was filtered to recover the solid. The solid was then washed with water, air-dried and recrystallized from methanol to yield the desired product 1-(3,4-dichlorophenyl)-1-carbamoyloxy-3-methylurea having a melting point of 147 to 149° C.

EXAMPLE 2

Preparation of 1-(3-chlorophenyl)-
1-carbamoyloxy-3-methylurea 1-(3-chlorophenyl)-1-hydroxy-3-methylurea (5 grams) dissolved in glacial acetic acid (30 ml.) was charged into a glass reaction flask equipped with a mechanical stirrer. Potassium cyanate (2.3 grams) was added to the flask at a temperature of between 15 and 20° C. The resulting mixture was then stirred for a period of about 2 hours resulting in the formation of a precipitate. Water (100 ml.) was added to the reaction mixture and was allowed to stand overnight. After this time a solid precipitate was recovered by filtration, was washed with water and was recrystallized from methanol to yield the desired product 1-(3-chlorophenyl)-1-carbamoyloxy-3-methylurea as a tan crystalline solid having a melting point of 128 to 130° C.

EXAMPLE 3

Preparation of 1-(3-methylphenyl)-
1-carbamoyloxy-3-methylurea 1-(3-methylphenyl) - 1 - hydroxy - 3 - methylurea (4.6 grams) was dissolved in glacial acetic acid (20 ml.) and was placed in a glass reaction flask equipped with a mechanical stirrer. The solution was cooled to a temperature of about 15° C. and potassium cyanate (2.3 grams)

was added thereto. The mixture was stirred for a period of about 2 hours resulting in the formation of a precipitate. Water (30 ml.) was added to the reaction mixture and a solid precipitate was recovered by filtration, was washed with water and was dried to yield the desired product 1-(3-methylphenyl)-1-carbamoyloxy - 3 - methylurea as a crystalline solid having a melting point of 120 to 122° C.

EXAMPLE 4

Preparation of 1-(2,6-dimethoxyphenyl)-1-carbamoyloxy-3,3-dimethylurea

A solution of 1-(2,6-dimethoxyphenyl)-1-hydroxy-3,3-dimethylurea (12 grams) in glacial acetic acid (50 ml.) is placed in a glass reaction flask equipped with a mechanical stirrer. The solution is cooled to a temperature of about 15° C. and potassium cyanate (4 grams) is added thereto. The reaction mixture is stirred for a period of about 2 hours resulting in the formation of a solid product. Water is added to the reaction mixture and the solid is recovered by filtration, is washed with water and is recrystallized to yield the desired product 1-(2,6-dimethoxyphenyl)-1-carbamoyloxy-3,3-dimethylurea.

EXAMPLE 5

Preparation of 1-(3,4-dibromophenyl)-1-carbamoyloxy-3-isopropylurea

A solution of 1-(3,4-dibromophenyl)-1-hydroxy-3-isopropylurea (17.6 grams) in glacial acetic acid (40 ml.) is placed into a glass reaction flask equipped with a mechanical stirrer. The solution is cooled to a temperature of about 10° C. and potassium cyanate (4 grams) is added thereto. The reaction mixture is stirred for a period of about 1 hour resulting in the formation of a solid product. Water (150 ml.) is added to the reaction mixture and a solid product is recovered by filtration, is washed with water, dried and recrystallized to yield the desired product 1 - (3,4-dibromophenyl)-1-carbamoyloxy-3-isopropylurea.

EXAMPLE 6

Preparation of 1-(4-trifluoromethylphenyl)-1-carbamoyloxy-3-n-pentylurea

A solution of 1-(4-trifluoromethylphenyl)-1-hydroxy-3-n-pentylurea (14.5 grams) dissolved in glacial acetic acid (50 ml.) is placed into a glass reaction flask equipped with a mechanical stirrer. The solution is cooled to a temperature of about 20° C. and potassium cyanate (4 grams) is added thereto. The mixture is stirred for a period of about 1 hour and water (150 ml.) is added thereto. The resulting solid precipitate is then recovered by filtration, is washed with water, dried and recrystallized to yield the desired product 1-(4-trifluoromethylphenyl)-1-carbamoyloxy-3-n-pentylurea.

Additional compounds within the scope of the present invention can be prepared in a manner similar to that described in the foregoing examples by substituting the appropriate starting materials into the procedures heretofore described. In the following examples are presented the essential ingredients to prepare the indicated named compounds by the foregoing methods.

EXAMPLE 7

1-(3-allylphenyl) - 1 - hydroxy-3,3-diethylurea+potassium cyanate=1-(3-allylphenyl)-1 - carbamoyloxy-3,3-diethylurea.

EXAMPLE 8

1-(4 - iodophenyl) - 1 - hydroxy-3-t-butylurea+potassium cyanate=1-(4-iodophenyl) - 1 - carbamoyloxy-3-t-butylurea.

EXAMPLE 9

1-(3-methyl - 5 - nitrophenyl)-1-hydroxy-3,3-di-n-propylurea+potassium cyanate=1 - (3 - methyl - 5 - nitrophenyl)-1-carbamoyloxy-3,3-di-n-propylurea.

EXAMPLE 10

1-(3 - dimethylaminophenyl) - 1 - hydroxy-3-methylurea+potassium cyanate=1-(3 - dimethylaminophenyl)-1-carbamoyloxy-3-methylurea.

EXAMPLE 11

1-(3-ethoxy - 4 - isopropylphenyl)-1-hydroxy-3-n-hexylurea+potassium cyanate=1-(3 - ethoxy - 4 - isopropylphenyl)-1-carbamoyloxy-3-n-hexylurea.

EXAMPLE 12

1-(2 - chloro-4-t-butoxyphenyl) - 1 - hydroxy-3-decylurea+potassium cyanate=1-(2-chloro-4-t-butoxyphenyl)-1-carbamoyloxy-3-decylurea.

EXAMPLE 13

1-(3 - pentyl - 5 - chlorophenyl)-1-hydroxy-3-methylurea+potassium cyanate=1-(3 - pentyl-5-chlorophenyl)-1-carbamoyloxy-3-methylurea.

EXAMPLE 14

1-(2-decyl - 4 - nitrophenyl)-1-hydroxy-3,3-di-n-pentylurea+potassium cyanate=1-(2 - decyl-4-nitrophenyl)-1-carbamoyloxy-3,3-di-n-pentylurea.

EXAMPLE 15

1-(4-hexyloxyphenyl) - 1 - hydroxy - 3,3 - dimethylurea+potassium cyanate=1-(4 - hexyloxyphenyl)-1-carbamoyloxy-3,3-dimethylurea.

EXAMPLE 16

1-(3-decyloxy - 5 - trichloromethylphenyl)-1-hydroxy-3-methylurea+potassium cyanate=1-(3 - decyloxy-5-trichloromethylphenyl)-1-carbamoyloxy-3-methylurea.

EXAMPLE 17

1-(4 - di-n-butylaminophenyl) - 1 - hydroxy-3-methylurea+potassium cyanate=1 - (4-di-n-butylaminophenyl)-1-carbamoyloxy-3-methylurea.

For practical use as herbicides, the compounds of this invention are generally incorporated into herbicidal compositions which comprise an inert carrier and a herbicidally toxic amount of such a compound. Such herbicidal compositions, which can also be called formulations, enable the active compound to be applied conveniently to the site of the weed infestation in any desired quantity. These compositions can be solids such as dusts, granules or wettable powders; or they can be liquids such as solutions, aerosols or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of herbicides can be dispersed under superatmospheric pressure as aerosols. However, preferred liquid herbicidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the weed infestation. The emulsifiers most commonly used in these concentrates are nonionic or mixtures of nonionic with anionic surface-active agents. With the use of some emulsifier systems an inverted emulsion (water-in-oil) can be prepared for direct application to weed infestations.

A typical herbicidal composition according to this invention is illustrated by the following example, in which the quantities are in parts by weight.

EXAMPLE 18

Preparation of a dust

Product of Example 1 _____ 10
Powdered talc _____ 90

The above ingredients are mixed in a mechanical grinder-blender and are ground until a homogeneous, free-flowing dust of the desired particle size is obtained. This dust is suitable for direct application to the site of the weed infestation.

The compounds of this invention can be applied as herbicides in any manner recognized by the art. One method for the control of weeds comprises contacting the locus of said weeds with a herbicidal composition comprising an inert carrier and, as an essential active ingredient, in a quantity which is herbicidally toxic to said weeds, a compound of the present invention. The concentration of the new compounds of this invention in the herbicidal compositions will vary greatly with the type of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, such as insecticides, nematocides, fungicides, and the like; stabilizers, spreaders, deactivators, adhesives, stickers, fertilizers, activators, synergists, and the like.

The compounds of the present invention are also useful when combined with other herbicides and/or defoliants, desiccants, growth inhibitors, and the like in the herbicidal compositions heretofore described. These other materials can comprise from about 5% to about 95% of the active ingredients in the herbicidal compositions. Use of combinations of these other herbicides and/or defoliants, desiccants, etc. with the compounds of the present invention provide herbicidal compositions which are more effective in controlling weeds and often provide results unattainable with separate compositions of the individual herbicides. The other herbicides, defoliants, desiccants and plant growth inhibitors, with which the compounds of this invention can be used in the herbicidal compositions to control weeds, can include chlorophenoxy herbicides such as 2,4-D, 2,4,5-T, MCPA, MCPB, 4(2,4-DB), 2,4-DEB, 4-CPB, 4-CPA, 4-CPP, 2,4,5-TB, 2,4,5-TES, 3,4-DA, silvex, and the like; carbamate herbicides such as IPC, CIPC swep, barban, BCPC, CEPC, CPPC, and the like; thiocarbamate and dithiocarbamate herbicides such as CDEC, metham sodium, EPTC, diallate, PEBC, perbulate, vernolate, and the like; substituted urea herbicides such as norea, siduron, dichloral urea, chloroxuron, cycluron, fenuron, monuron, monuron TCA, diuron, linuron, monolinuron, neburon, buturon, trimeturon, and the like; symmetrical triazine herbicides such as simazine, chlorazine, atratone, desmetryne, norazine, ipazine, prometryn, atrazine, trietazine, simetone, prometone, propazine, ametryne, and the like; chloroacetamide, herbicides such as alpha-chloro - N,N - dimethylacetamide, CDEA, CDAA, alpha-chloro-N-isopropylacetamide, 2-chloro - N - isopropylacetanilide, 4-(chloroacetyl)morpholine, 1 - (chloroacetyl)piperidine, and the like; chlorinated aliphatic acid herbicides such as TCA, dalapon, 2,3-dichloropropionic acid, 2,2,3-TPA, and the like; chlorinated benzoic acid and phenylacetic acid herbicides such as 2,3,6-TBA, 2,3,5,6-TBA, dicamba, tricamba, amiben, fenac, PBA, 2-methoxy-3,6-dichlorophenylacetic acid, 3-methoxy-2,6-dichlorophenylacetic acid, 2,4-dichloro - 3 - nitrobenzoic acid, 2-methoxy-3,5,6-trichlorophenylacetic acid, and the like; and such compounds as aminotriazole, maleic hydrazide, phenyl mercuric acetate, endothal, biuret, technical chlordane, dimethyl 2,3,5,6-tetrachloroterephthalate, diquat, erbon, DNC, DNBP, dichlobenil, DPA, diphenamid, dipropalin, trifluralin, solan, dicryl, merphos, DMPA, O—S-dimethyl tetrachlorothioterephthalate, methyl 2,3,5,6 - tetrachloro - N-methoxy-N-methylterephthalamate, 2 - [(4 - chloro - o-tolyl)-oxy]-N-methoxyacetamide, DSMA, MSMA, potassium azide, acrolein, benefin, bensulide, AMS, bromacil, bromoxynil, cacodylic acid, CMA, CPMF, cypromid, DCB, DCPA, dichlone, diphenatril, DMTT, DNAP, EBEP, EXD, HCA, ioxynil, IPX, isocil, potassium cyanate, MAA, MAMA, MCPES, MCPP, MH, molinate, NPA, OCH, paraquat, PCP, picloram, DPA, PCA, pyrichlor, sesone, terbacil, terbutol, TCBA, brominil, CP-50144, H-176-1, H-732, M-2901, planavin, sodium tetroborate, calcium cyanamid, DEF, ethyl xanthogen, disulfide, sindone, sindone B, propanil, and the like.

Such herbicides can also be used in the methods and compositions of this invention in the form of their salts, esters, amides and other derivatives whenever applicable to the particular parent compounds.

Weeds are undesirable plants growing where they are not wanted, having no economic value, and interfering with the production of cultivated crops, with the growing of ornamental plants, or with the welfare of livestock. Many types of weeds are known, including annuals such as pigweed, lamb's-quarters, foxtail, crabgrass, wild mustard, field pennycress, ryegrass, goose-grass, chickweed, wild oats, velvet leaf, purselane, barnyard grass, smartweed, knotweed, cocklebur, wild buckwheat, kochia, medic, corn cockle, ragweed, sowthistle, coffeeweed, croton, cuphea, dodder, fumitory, groundsel, hemp nettle, knowel, spurge, spurry, emex, jungle rice, pondweed, dog fennel, carpetweed, morning glory, bedstraw, ducksalad and naiad; biennials such as wild carrot, matricaria, wild barley, campion, chamomile, burdock, mullein, round-leaved mallow, bull thistle, hounds-tongue, moth mullein and purple star thistle; or perennials such as white cockle, perennial rye-grass, quackgrass, Johnson grass, Canada thistle, hedge bindweed, Bermuda grass, sheep sorrel, curley dock, nutgrass, field chickweed, dandelion, campanula, field bindweed, Russian knapweed, mesquite, toadflax, yarrow, aster, gromwell, horsetail, ironweed, sesbania, bulrush, cattail and winter-cress.

Similarly, such weeds can be classified as broadleaf or grassy weeds. It is economically desirable to control the growth of such weeds without damaging beneficial plants or livestock.

The new compounds of this invention are particularly valuable for weed control because they are toxic to many species and groups of weeds while they are relatively non-toxic to many beneficial plants. The exact amount of compound required will depend on a variety of factors, including the hardiness of the particular weed species, weather, type of soil, method of application, the kind of beneficial plants in the same area, and the like. Thus, while the application of up to only about one or two ounces of active compound per acre may be sufficient for good control of a light infestation of weeds growing under adverse conditions, the application of ten pounds or more of active compound per acre may be required for good control of a dense infestation of hardy perennial weeds growing under favorable conditions.

The herbicidal toxicity of the new compounds of this invention can be illustrated by many of the established testing techniques known to the art, such as pre- and post-emergence testing.

The herbicidal activity of the compounds of this invention was demonstrated by experiments carried out for the pre-emergence control of a variety of weeds. In these experiments small plastic greenhouse pots filled with dry soil were seeded with the various weed seeds. Twenty-four hours or less after seeding the pots were sprayed with water until the soil was wet and 1-(3,4-dichlorophenyl)-1-carbamoyloxy-3-methylurea formulated as an aqueous emulsion of an acetone solution containing emulsifiers was sprayed at the indicated concentrations on the surface of the soil.

After spraying, the soil containers were placed in the greenhouse and provided with supplementary heat as required and daily or more frequent watering. The plants were maintained under these conditions for a period of from 15 to 21 days, at which time the condition of the plants and the degree of injury to the plants was rated on a scale of from 0 to 10, as follows: 0=no injury, 1, 2= slight injury, 3, 4=moderate injury, 5, 6=moderately severe injury, 7, 8, 9=severe injury and 10=death. The effectiveness of these compounds is demonstrated by the following data:

TABLE 1

| Wood species | Concentration of test compound in lbs. per acre | Injury rating |
| --- | --- | --- |
| Barnyard grass | 8 | 9 |
| Do | 4 | 8 |
| Coffee weed | 8 | 10 |
| Do | 4 | 10 |
| Crabgrass | 8 | 10 |
| Do | 4 | 10 |
| Curly dock | 8 | 10 |
| Do | 4 | 9 |
| Downy brome | 8 | 10 |
| Do | 4 | 9 |
| Foxtail | 8 | 10 |
| Do | 4 | 9 |
| Johnson grass | 8 | 10 |
| Do | 4 | 7 |
| Mustard | 8 | 10 |
| Do | 4 | 10 |
| Velvet leaf | 8 | 7 |
| Do | 4 | 7 |

The herbicidal activity of the compounds of this invention was also demonstrated by experiments carried out for the post-emergence control of a variety of weeds. In these experiments the compound 1-(3,4-dichlorophenyl)-1-carbamoyloxy-3-methylurea formulated as an aqueous emulsion was sprayed at the indicated dosage on the foilage of the various weeds that had attained a prescribed size. After spraying, the plants were placed in a greenhouse and watered daily or more frequently. Water was not applied to the foilage of the treated plants. The severity of the injury was determined 10 to 15 days after treatment and was rated on the scale of from 0 to 10 heretofore described. The effectiveness of these compounds is demonstrated by the following data:

TABLE 2

| Wood species | Concentration of test compound in lbs. per acre | Injury rating |
| --- | --- | --- |
| Barnyard grass | 8 | 9 |
| Do | 4 | 9 |
| Bindweed | 8 | 9 |
| Do | 4 | 9 |
| Coffee weed | 8 | 10 |
| Do | 4 | 10 |
| Crabgrass | 8 | 10 |
| Do | 4 | 7 |
| Curly dock | 8 | 9 |
| Do | 4 | 9 |
| Downy brome | 8 | 10 |
| Do | 4 | 9 |
| Foxtail | 8 | 10 |
| Do | 4 | 9 |
| Johnson grass | 8 | 9 |
| Do | 4 | 5 |
| Matricaria | 8 | 10 |
| Do | 4 | 10 |
| Mustard | 8 | 10 |
| Do | 4 | 10 |
| Pigweed | 8 | 10 |
| Do | 4 | 10 |
| Velvet leaf | 8 | 10 |
| Do | 4 | 9 |

The new compounds of this invention are fungicidal in their ability to kill, inhibit or inactivate a fungus so that it does not grow. Practically, these compounds can be used to prevent fungi and molds from harming cloth, wood, plants, seeds, fruit, animals or whatever else they attack. The fungicidal compounds should preferably be applied before the infection has occurred and certainly before it has progressed very far.

For practical use as fungicides, the compounds of this invention are generally incorporated into fungicidal compositions which comprise an inert carrier and a fungicidally toxic amount of such a compound. Such fungicidal compositions, which are usually known in the art as formulations, enable the active compound to be applied conveniently to the site of the fungus infestation in any desired quantity. The compositions can be solids such as dusts, granules or wettable powders; or they can be liquids such as solutions, aerosols or emulsifiable concentrates. These compositions can be prepared in a manner similar to that of the herbicidal compositions heretofore described.

The compounds of the present invention are also useful when combined with other fungicides in the fungicidal compositions heretofore described. The other fungicides can comprise from about 5 percent to about 95 percent of the active ingredients in the fungicidal compositions. Use of combinations of these other fungicides with the compounds of the present invention provides fungicidal compositions which are more effective in controlling fungi and often provide results unattainable with separate compositions of the individual fungicides. The other fungicides, with which the compounds of this invention can be used in the fungicidal compositions to control fungi, can include fungicides such as 2-aminobutane, bordeaux mixture, ammonium dimethyl dithiocarbamate, benzoyl trimethyl ammonium bromide, cadmium sulfate, captan, chloranil, copper sulfate, cycloheximide, dichlone, 2,4-dichloro-6-(2-chloroanilino)-s-triazine, DDT, dichloran, p-dimethylaminobenzenediazo sodium sulfonate, dinocap, diphenylmercuri 8-hydroxyquinolinate, dodine, ethylmercuric chloride, ferbam, folpet, gliodin, maneb, metham, mezineb, nabam, pentachloronitrobenzene, PMA, phenylmercuric urea, streptomicin, thiram, zineb, ziram, difolatan, PCNB, and the like.

Such fungicides can also be used in the methods and compositions of this invention in the form of their esters, amides and other derivatives whenever applicable to the particular parent compounds.

When the compounds of this invention are used as agricultural fungicides, they can be applied to plant foliage, to seeds, to the soil, or to such parts of plants as the fruits themselves. Plants are susceptible to a great many diseases which cause widespread damage; and among some of the more important which can be mentioned are late blight on tomato, powdery mildew on cucumber (*Erisiphe cichoraceaarum*), cereal leaf rust on wheat (*Puccinia rubigovera*), and such common soil fungi as fusarium wilt (*Fusarium oxysporum*), the seed rot fungus (*Phythium debaranum*), and the sheath and culm blight (*Rhizoctonia solani*). The new compounds of this invention can also be employed as industrial fungicides to control a variety of fungi which attack such materials as adhesives, cork, paints, lacquers, leather, wood, plastics and textiles, such as cotton and wool.

The quantity of active compound of this invention to be used for good disease control will depend on a variety of factors, such as the particular disease involved, the intensity of the infestation, formulation, weather, type of crop, and the like. Thus, while the application of only one or two ounces of active compound per acre of a crop may be sufficient to control a light infestation of certain fungi, a pound or more of active compound per acre may be required to control a heavy infestation of a hardy species of fungus.

The fungicidal activity of the compounds of this invention was illustrated for the systemic control of leaf rust of wheat (*Puccinia rubigo-vera*). In this experiment the soil, in 4 inch plastic pots containing 5 day old wheat plants, was treated with a solution of the test compound at various rates. The pots were then placed in a greenhouse. After five days the wheat plants were inoculated by shaking a 9 to 13 day old leaf rust of wheat culture over their foliage. The plants were then placed in a moist chamber overnight and returned to the greenhouse. After 9 to 10 days, following inoculation, the extent of the disease was observed and rated in comparison to untreated controls. The results are as follows:

TABLE 3

| Test compound | Concentration of test compound in lbs. per acre | Percent control |
|---|---|---|
| Product of Example 1 | 40 | 100 |
| Do | 16 | 91.5 |
| Product of Example 2 | 40 | 100 |
| Do | 16 | 100 |
| Product of Example 3 | 40 | 100 |
| Do | 16 | 97 |

We claim:
1. A compound of the formula

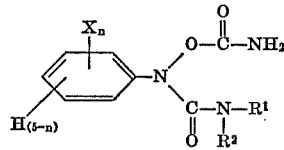

wherein X is selected from the group consisting of alkyl, alkenyl, halogen, haloalkyl, alkoxy, alkylthio, nitro and dialkylamino; $n$ is an integer from 0 to 5; and $R^1$ and $R^2$ are independently selected from the group consisting of hydrogen and alkyl.

2. The compound of claim 1, 1-(3,4-dichlorophenyl)-1-carbamoyloxy-3-methylurea.

3. The compound of claim 1, 1-(3-chlorophenyl)-1-carbamoyloxy-3-methylurea.

4. The compound of claim 1, 1-(3-methylphenyl)-1-carbamoyloxy-3-methylurea.

References Cited

UNITED STATES PATENTS

| 3,192,261 | 6/1965 | Losee et al. | 260—545 |
| 3,219,428 | 11/1965 | Weil et al. | 71—2.6 |
| 3,439,018 | 4/1969 | Brookes et al. | 260—471 |

FOREIGN PATENTS

| 182,729 | 6/1966 | U.S.S.R. | 260—545 |

OTHER REFERENCES

Baskakov et al., Biol. Aktiv. Soedin, 1968 (pp. 70-6), abstract only.

LORRAINE A. WEINBERGER, Primary Examiner

R. GERSTL, Assistant Examiner

U.S. Cl. X.R.

71—98, 113; 424—315